United States Patent [19]
Fern

[11] Patent Number: 5,089,145
[45] Date of Patent: Feb. 18, 1992

[54] WATER TREATMENT APPARATUS AND METHOD

[76] Inventor: Charles S. Fern, 3306 N. Kentwood Ct., Peoria, Ill. 61604-1526

[21] Appl. No.: 601,908

[22] Filed: Oct. 22, 1990

[51] Int. Cl.⁵ .............................................. C02F 1/46
[52] U.S. Cl. ................................... 210/748; 210/243; 204/144; 204/186; 204/302
[58] Field of Search ................ 210/748, 243; 204/186, 204/302, 149

[56] References Cited

U.S. PATENT DOCUMENTS

| | | | |
|---|---|---|---|
| 1,956,411 | 4/1934 | Bonine | 204/25 |
| 2,299,964 | 10/1942 | Crouch | 204/149 |
| 2,490,730 | 12/1949 | Dubilier | 204/305 |
| 3,547,801 | 12/1970 | Paine | 204/305 |
| 3,637,482 | 1/1972 | Vajda | 204/128 |
| 3,925,638 | 12/1975 | Scatoloni | 219/295 |
| 3,972,800 | 8/1976 | King | 204/302 |
| 4,024,047 | 5/1977 | Clark et al. | 204/302 |
| 4,073,712 | 2/1978 | Means et al. | 204/186 |
| 4,097,355 | 6/1978 | Fischer | 204/228 |
| 4,326,954 | 4/1982 | Shroyer | 210/222 |
| 4,419,206 | 12/1983 | Frame | 204/149 |
| 4,545,887 | 10/1985 | Arnesen et al. | 204/302 |
| 4,692,232 | 9/1987 | King | 204/278 |
| 4,772,369 | 9/1988 | Mercier et al. | 204/149 |

Primary Examiner—Robert A. Dawson
Assistant Examiner—David Reifsnyder
Attorney, Agent, or Firm—Willian Brinks Olds Hofer Gilson & Lione

[57] ABSTRACT

A water treatment apparatus and method that utilizes a high voltage element. The apparatus comprises a tank having an inlet through which water to be treated can enter the tank and outlet through which treated water can exit the tank, a hollow sealed shaft positioned inside the tank, and a high voltage source located inside the shaft.

16 Claims, 2 Drawing Sheets

WATER TREATMENT APPARATUS AND METHOD

BACKGROUND OF THE INVENTION

This invention relates a water treatment apparatus and method and more particularly to an electronic water treatment apparatus method.

Numerous devices and methods have been directed in the past to treat water in order to eliminate or reduce the problems associated with water hardness. The effects of hard water are well known. Hard water is known to cause scaling that can eventually clog pipes, ice makers, coffee machines, air conditioners, and other appliances in homes and businesses. In the domestic environment, other drawbacks associated with hard water use include the reduced effectiveness of cleaning materials, such as detergents, build-up in bathroom fixtures and dish washers, and bad or off-taste. In commercial and public establishments, such as restaurants, hospitals, schools, and so on, similar deleterious effects result from the use of hard water but on a larger scale. In industrial settings, scaling of pipes presents problems sometimes requiring continuous treatment and rehabilitation to maintain peak operating status for water supply and circulation systems.

Existing methods for the treatment of hard water can offset some of these disadvantages noted above, but do so often at the expense of providing a new set of problems by way of tradeoff. For example, a commonly used way for treating hard water in the home is with a water softener that uses a salt exchange method. This type of system requires bringing into the home on a continuing and regular basis large quantities of salt either in block or pellet form. Moreover, typical water softeners require that the system be flushed regularly in a procedure that typically produces several hundred gallons of salty waste water. In addition, the typical water softener produces water that many people consider to have poor taste and, moreover, which may pose health concerns related to regular consumption by certain segments of the population.

Various other types of water treatment systems have been developed over the years. For example, in U.S. Pat. No. 4,419,206, a device is disclosed that includes two relatively low voltage electrodes (e.g. 6.3 volts). These electrodes may become coated with deposits and a warning light is provided to indicate that deposits have accumulated on an anode. Also, the device may have to adjusted depending upon the specific water supply to which it is connected.

Another device is disclosed in U.S. Pat. No. 4,772,369. This device requires that a "strong cathode" and a "weak cathode" are both submerged in the water being treated.

These and other systems have drawbacks associated with them including high cost of operation, inconsistent effectiveness, or the need to specifically tailor the device to a particular water treatment system.

Accordingly, it is an object of the present invention to provide a water treatment apparatus and method to reduce the effects of hard water and that is effective and safe.

It is another object of the present invention to provide a water treatment apparatus and method that is conservative of environmental resources.

It is another object of the present invention to provide a water treatment apparatus and method that is inexpensive and adaptable for the needs of various users.

It is another object of the present invention to provide a water treatment apparatus and method that does not require modification to function with different types of water supplies.

It is still another object of the present invention to provide a water treatment apparatus and method that requires little or no maintenance.

SUMMARY OF THE INVENTION

According to a first aspect of the present invention, there is provided a water treatment apparatus that utilizes a high voltage element to reduce or eliminate the effects of water hardness. The apparatus comprises a tank having an inlet through which water to be treated can enter the tank and an outlet through which treated water can exit the tank, a hollow sealed shaft positioned inside the tank, and a high voltage source located inside the shaft.

According to another aspect of the invention, there is provided a method for water treatment comprising passing water to be treated past a high voltage source isolated from the water by a non-conductive material.

DETAILED DESCRIPTION OF THE PRESENTLY PREFERRED EMBODIMENTS

Figure 1:
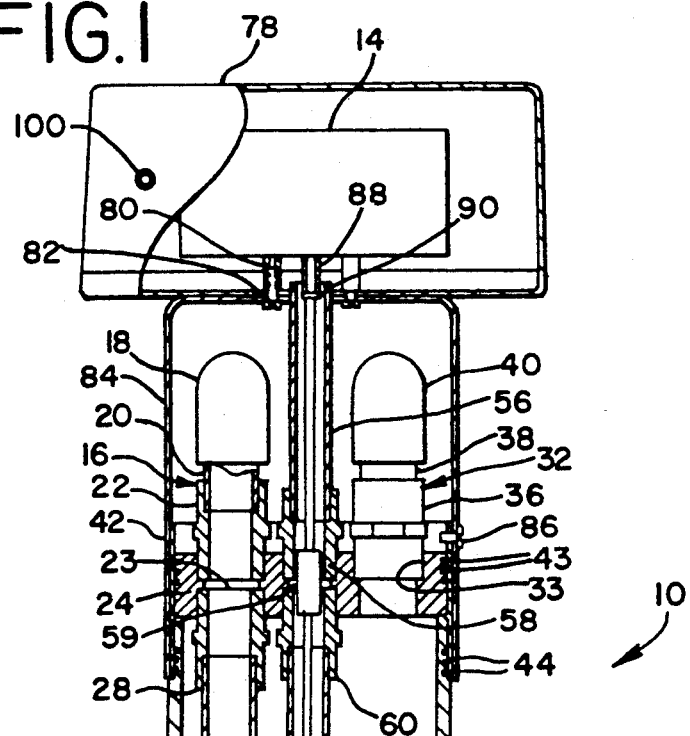
FIG. 1 is a sectional view of an embodiment of the present invention.

Referring to FIG. 1, there is depicted a vertical sectional view of a preferred embodiment 10 of the present invention. The embodiment described herein is sized and adapted for use in a home. Water may be supplied to the embodiment by connection to a building's water supply such as at the location where the water service enters the building downstream from the main water shut off valve. Alternatively, the present embodiment may be used in settings in which the building has its own water supply such as a well. In the latter setting, the embodiment would also be connected at a location near the point of entry of the water supply into the building.

This embodiment includes a tank portion 12 and a power module 14. In a preferred embodiment, the tank portion 12 is a stainless steel tank which is approximately 3 feet in height and 6 inches in diameter. These dimensions as well as the rest of the dimensions provided herein are considered to be exemplary of one embodiment and it is understood that other dimensions of components as well as other details of construction are contemplated within the scope of the present invention.

Water from the water supply enters the tank portion 12 through an inlet 16. Inlet 16 in a preferred embodiment is comprised of a ¾ inch chloride) elbow 18, a short length of ¾ inch PVC pipe 20, and a ¾ inch PVC to ¾ inch pipe thread adapter 22. Connection between these three pieces may be made by ordinary PVC cement or an equivalent. Connection of the inlet 16 to the building's water supply may be made by any suitable means consistent with good plumbing practice and local codes.

Figure 2:
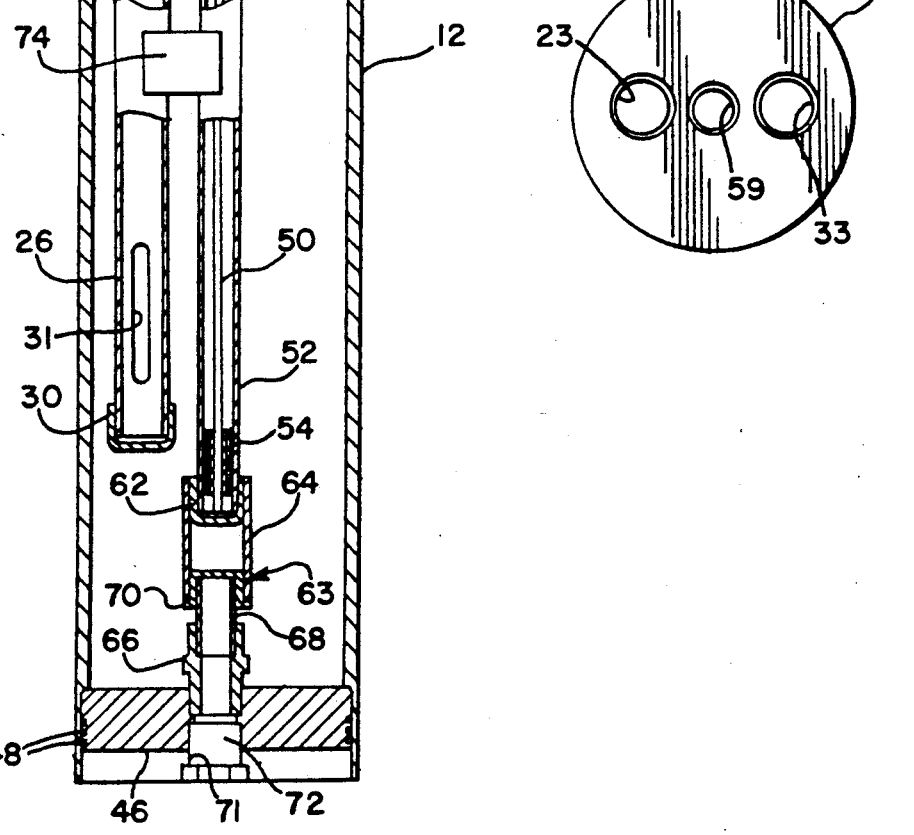
FIG. 2 is a top view of the top plug depicted in the embodiment of FIG. 1.

The inlet 16 provides for communication with the interior of the tank portion 12 through an inlet port 23 (see FIG. 2) located in a top plug 24 of the tank portion 12. In a preferred embodiment, the pipe thread adapter 22 is connected into the top plug 24 by a threaded connection. The top plug 24 forms an insulating, ported passage into and out of the tank portion 12 and also serves as a portion of the seal for the upper end of the tank portion 12. The top plug 24 may be fabricated from a 1 inch thick, rigid PVC sheet.

Water enters into the tank portion 12 by passing from the inlet 16 through an inlet standpipe 26. The inlet standpipe 26 may be fabricated from a ¾ inch PVC pipe. Connection of the inlet standpipe 26 to the top plug 24 may be made through another ¾ inch PVC to a ¾ inch pipe thread adapter 28. The inlet standpipe 26 extends from the inlet 16 at substantially the top of the tank portion 12 almost to the bottom of the tank portion 12. In a preferred embodiment, the inlet standpipe 26 is approximately 2 feet in length. The inlet standpipe 26 is capped off at the bottom end thereof with a standpipe cap 30 which may be a ¾ inch PVC cap. An oblong opening 31 is located in a side wall of the inlet standpipe 26. This opening 31 is of sufficient size to allow water to pass from the inlet standpipe 26 to the interior of the tank portion 12. In a preferred embodiment, the opening 31 is approximately 5 inches long and ⅜ inches wide. This opening 31 is oriented in a tangential direction relative to the interior walls of the tank portion 12 so that with ordinary pressure provided by the municipal water service (or by the pump pressure where the building has its own well), water is directed in a circular flow path around the inside of the tank portion 12. The oblong opening 31 may be formed by machining into the inlet standpipe 30.

Water exits the tank through a tank exit 32 after circulating around the inside of the tank portion 12 from bottom to top. The tank exit 32 communicates with the interior of the tank portion 12 through an outlet port 33 in the top plug 24. In a preferred embodiment, the tank exit 32 includes a ¾ inch PVC to ¾ inch pipe thread adapter 36, a short length of ¾ inch PVC pipe 38, and a ¾ inch PVC elbow 40. The ¾ inch PVC to ¾ inch pipe thread adapter 36 preferably connects the tank exit 32 to the outlet port 33 in the top plug 24 by a threaded connection. Connection of the tank exit 32 to the building's water system may be made by any suitable means consistent with good plumbing practice and local codes.

The top plug 24 is secured to the tank portion 12 by a collar 42. Preferably, the collar 42 is made of stainless steel and machined with threads to connect to threaded portions on both the tank portion 12 and the top plug 24. The upper end of the tank portion 12 is sealed by two o-rings 43 in the top plug 24 and two more o-rings 44 in the tank portion 12.

The bottom of the tank portion 12 may be formed of a lower plug 46. The lower plug 46 may be constructed and fabricated in a manner similar to the top plug 24, e.g. from 1 inch rigid PVC sheet. The lower plug 46 serves as both a seal for the lower end of the tank portion 12 and as a support structure for the additional components, as described below. The lower plug 46 is preferably connected to the tank portion 12 by means of a threaded connection. A watertight seal may be provided between the tank portion 12 and the lower plug 46 by the use of two o-rings 48.

Located centrally in the tank portion 12 is an anode 50. The anode 50 is a high voltage element. The anode 50 connects to the power module 14 located above the tank portion 12 and extends downward into the tank portion 12 approximately to the lower end thereof. In a preferred embodiment, the anode 50 is made of a ⅛ inch diameter brass rod approximately 3 feet in length. The anode 50 is located and positioned inside of an anode pipe 52. The anode pipe 52 is a length of pipe sealed and watertight so that water from the inside of the tank portion 12 does not come in contact with the anode 50. In a preferred embodiment, the anode pipe 52 is a ½ inch PVC pipe. Preferably, the anode 50 is evenly spaced from the interior walls of anode pipe 52. One or more anode guides 54 may be positioned and retained along the length of the anode 50 to space it from the interior walls of anode pipe 52. The anode guides 54 are made of an insulating material and may be fabricated from flexible PVC tubing. The anode guides 54 may connect to the anode 50 and the anode pipe 52 by a friction fit.

In the region between the power module 14 and the top plug 26, the anode 50 is located inside of a connecting pipe 56. The connecting pipe 56 connects to an adapter 58 which in turn connects to a third opening 59 in the top plug 26. The connecting pipe 56 may be a length of ½ inch PVC pipe; the adapter 58 may be a ½ inch PVC to ½ inch pipe threaded adapter; and the connection of the adapter 58 to the top plug 26 may be by means of a threaded connection in the third opening 59. Connection of the anode pipe 52 to the top plug 26 is made with another adapter 60 which may also be a ½ inch PVC to ½ inch threaded pipe adapter.

The lower end of the anode pipe 52 includes a anode cap 62 which may be a ½ inch PVC cap. The lower end of the anode pipe 52 connects to and is supported by the lower plug 46. This connection is provided by a support structure 63. The support structure 63 includes a receiving pipe 64 into which the anode cap 62 of the anode pipe 52 may be positioned. The support structure 63 also includes an adapter 66 which is connected to the lower plug 46. The adapter 66 connects to the receiving pipe 64 by means of a middle pipe 68 connected to the adapter 66 to which is connected a bushing 70. The bushing 70 in turn is connected to the receiving pipe 64. In a preferred embodiment, the receiving pipe 64 may be a length of ¾ inch PVC, the adapter 66 may be a ½ inch threaded pipe adapter, the middle pipe 68 may be a length of ½ inch PVC pipe, and the bushing 70 may be a PVC ¾ inch to ½ inch bushing. This support structure 63 is preferably threaded into an opening 71 of the lower plug 46. A bottom plug 72 seals the lower plug 46. The bottom plug 72 may be a ½ inch PVC threaded plug that can be received in the threaded opening 71 in the bottom of lower plug 46.

An interpipe support 74 connects the standpipe 26 and the anode pipe 52. The interpipe support 74 may be fabricated from a piece of 1 inch rigid PVC sheet and machined to accept the radii of the anode pipe 52 and the inlet standpipe 26. The interpipe support 74 may be secured in position with PVC cement, and serves to add rigidity to the internal structure of the present embodiment.

All PVC to PVC interference fit connectors are mechanically secured and sealed against water leakage with PVC cement. All mechanical pipe thread connections are treated with teflon tape, to effect a watertight seal.

The power module 14 converts ordinary house current (e.g. 117–120 Volt AC) to approximately 4,000 volts DC. The power module 14 is housed by a two piece, die cast aluminum enclosure 78. The power module 14 and enclosure 78 are mechanically and electrically connected to the tank portion 12, which serves as the cathode of the embodiment. This connection may be made through any suitable means such as through four threaded brass spacers 80, four brass machine screws 82, a cap 84, and three brass machine screws 86. The cap 84 may be a deep drawn aluminum cap. The three brass machine screws 86 attach the cap 84 to the stainless steel collar 42 which is mechanically threaded to the top of the stainless steel tank 12.

The anode 50 is mechanically and electrically connected to the power module 14 through a threaded brass connector 88. The anode 50 is secured to the brass connector 88 with a brass jam nut 90.

Figure 3:
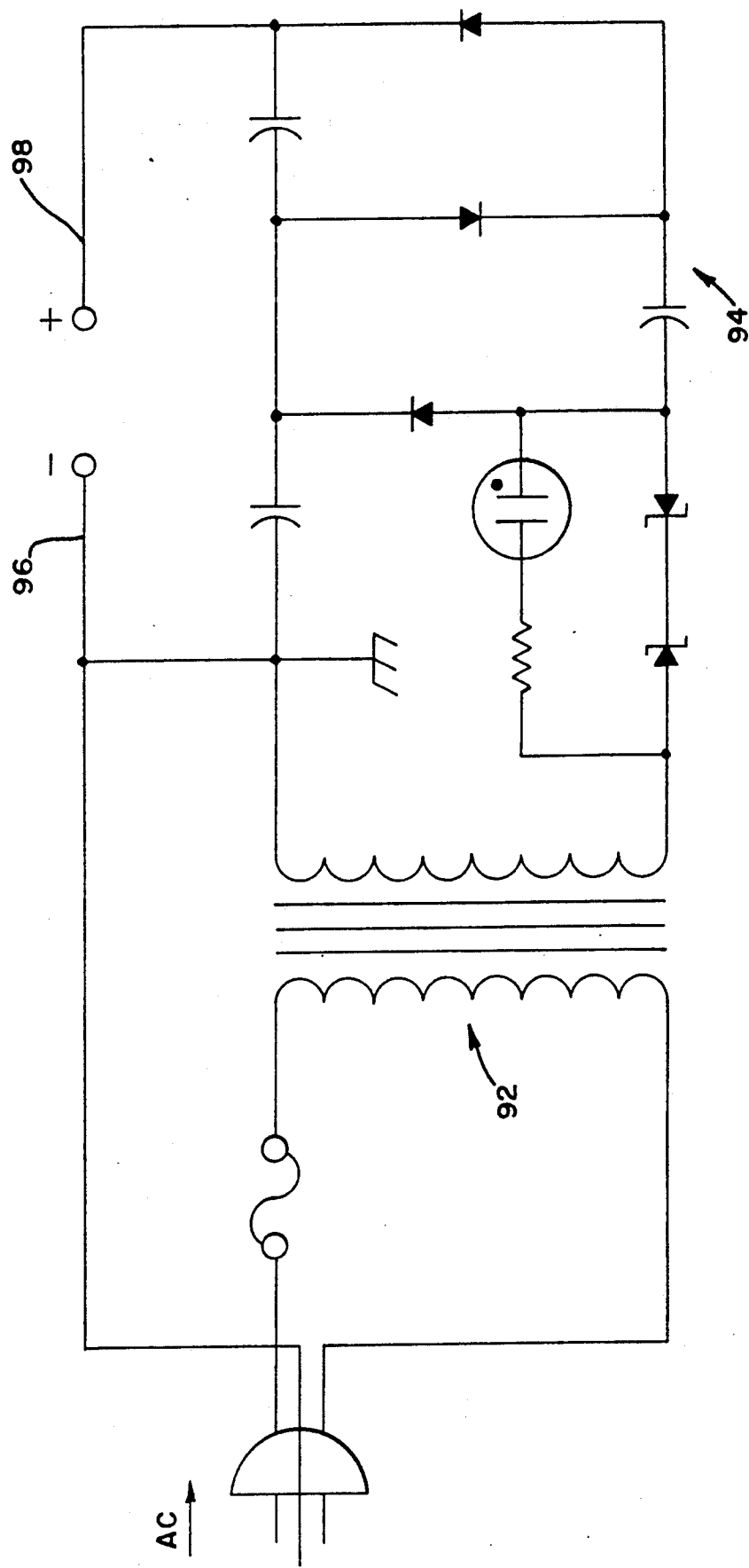
FIG. 3 is a schematic of the power module portion of the embodiment depicted in FIG. 1.

Referring to FIG. 3, there is a schematic of the power module 14 of FIG. 1. The power module 14 includes a transformer 92 to transform ordinary house current to approximately 1,000 Volts AC. A capacitor-diode voltage tripling rectifier circuit 94 then converts this 1,000 Volts AC to approximately 4,000 Volts DC. The negative output 96 of the power module 14 is electrically and mechanically connected to the enclosure 78, tank portion 12, and earth ground. The connection of the embodiment to the supply power includes a direct mechanical connection to earth ground to insure that all exposed surfaces are maintained at earth potential. The positive output 98 of the power module 14 is electrically and mechanically connected to the anode 50.

The electrostatic potential that exists between the anode 50 and the cathode, or tank portion 12, is believed to be the vehicle that produces the effect on the water passing through the tank.

An indicator lamp 100 serves as a gross indicator of the output power, glowing at full intensity at an output power level of approximately 2 watts.

Operation of the present embodiment is automatic and relies on water demand to draw water through the tank portion where it is treated.

The present invention has been described in terms of an embodiment that is appropriately sized for use in an average domestic setting, such as a home. However, the present invention may be readily adapted for use in both commercial and industrial settings as well as for use in multi-unit dwellings. For example, by selecting a tank of a larger size, with either the same or a larger anode and the same or similar power module, the water needs of a multi-family apartment building could be served. Similarly, the present invention could be used with a smaller tank size, with a smaller or the same anode and likewise with the same or smaller power module, for specific appliances, for example in a coffee dispensing machine.

The embodiment of the present invention described herein has been found to significantly reduce the effects of hardness of water. It has been observed that with continued use of an embodiment of the present invention, prior adverse effects of hardness, for example scaling of pipes, have not only stopped but also have been reversed. The thickness of scale inside pipes has actually been reduced.

It is intended that the foregoing detailed description be regarded as illustrative rather than limiting and that it is understood that the following claims including all equivalents are intended to define the scope of the invention.

I claim:

1. A water treatment apparatus comprising:
   a tank having an inlet through which water can enter the tank and outlet through which water can exit the tank;
   a hollow sealed non-conductive shaft positioned inside and spaced from an inner wall of said tank; and
   a high voltage source located inside and spaced from an inner wall of said shaft.

2. The apparatus of claim 1 further comprising:
   one or more spacers located between said high voltage source and said inner wall of said hollow sealed shaft whereby said high voltage source is positioned from said inner wall of said hollow sealed shaft.

3. The apparatus of claim 1 in which said high voltage source is a high voltage DC source.

4. The apparatus of claim 3 in which said high voltage source is approximately 4000 volts.

5. The apparatus of claim 1 in which said hollow sealed shaft is made of PVC.

6. The apparatus of claim 1 further comprising:
   a power module located outside said tank for converting house current to high voltage DC and further in which said power module is connected to said high voltage source.

7. The apparatus of claim 1 in which said tank is made of stainless steel.

8. The apparatus of claim 1 further comprising:
   a standpipe located inside said tank and communicating with said inlet and having an opening therein for allowing water to exit said standpipe and enter the interior of said tank.

9. The apparatus of claim 8 in which the opening in said standpipe is oriented in a direction tangential to an inner surface of said tank and a surface of said hollow sealed shaft whereby water passing from the inlet to the outlet of said tank circulates past the inner surface of said tank and the surface of said hollow sealed shaft.

10. A water treatment system comprising:
    a power module capable of providing a high voltage output;
    an electrically-conducting tank having an inlet through which water can enter the tank and outlet through which water can exit the tank, said tank connected to said power module and to ground;
    a hollow, sealed, non-conducting shaft positioned inside said tank and communicating with said power module; and
    an anode connected to the high voltage output of said power module and located inside and spaced from an inner wall of said shaft.

11. A water treatment system comprising:
    a tank forming a cathode having an inlet through which water can enter the tank and outlet through which water can exit the tank;
    a hollow sealed non conducting shaft positioned inside said tank;
    a high voltage anode located inside said shaft and spaced from an inner wall thereof,
    whereby water passing from the inlet of the tank and the outlet of the tank passes between said anode and said cathode formed by the tank.

12. The apparatus of claim 11 in which said high voltage source is approximately 4000 volts.

13. The method of claim 11 in which the high electrical potential between the anode and the cathode is approximately 4000 volts.

14. A method for treating water to reduce the effects of hardness comprising:

establishing a high electrical potential between an anode and a cathode;

isolating the anode electrically from the water by positioning the anode in a hollow sealed non-conductive shaft spaced from an inner wall thereof; and passing the water to be treated between the anode and the cathode whereby the effects of the hardness of the water can be reduced.

15. The method of claim 14 in which the step of isolating the anode further comprises:

isolating the high electrical potential by means of a non-conductive material and a spacing.

16. The method of claim 14 further comprising the step of:

circulating the water to be treated in a cylindrical tank from an inlet located in a lower end thereof around the anode located centrally therein and out the exit located in an upper portion of the cylindrical tank.

* * * * *

UNITED STATES PATENT AND TRADEMARK OFFICE
CERTIFICATE OF CORRECTION

PATENT NO. : 5,089,145
DATED : February 18, 1992
INVENTOR(S) : Charles S. Fern

It is certified that error appears in the above-identified patent and that said Letters Patent is hereby corrected as shown below:

In column 1, line 19, please delete "dish washers" and substitute therefor --dishwashers--.

In column 1, line 50, before "adjusted" please insert --be--.

In column 2, line 62, before "chloride" please insert --PVC (polyvinyl--.

IN THE CLAIMS

In claim 11, line 5, after "hollow" please insert --,-- and delete "non conducting".

UNITED STATES PATENT AND TRADEMARK OFFICE
CERTIFICATE OF CORRECTION

PATENT NO. : 5,089,145
DATED : February 18, 1992
INVENTOR(S) : Charles S. Fern

It is certified that error appears in the above-identified patent and that said Letters Patent is hereby corrected as shown below:

Col. 7, claim 14, line 6, after "hollow" insert
--,--, and after "sealed" insert --,--.

Signed and Sealed this

Twenty-fourth Day of August, 1993

Attest:

BRUCE LEHMAN

Attesting Officer     Commissioner of Patents and Trademarks